United States Patent
Li et al.

(10) Patent No.: US 11,646,775 B2
(45) Date of Patent: May 9, 2023

(54) INFORMATION PROCESSING METHOD AND DEVICE, AND STORAGE MEDIUM

(71) Applicant: ZTE CORPORATION, Guangdong (CN)

(72) Inventors: Yong Li, Guangdong (CN); Yijian Chen, Guangdong (CN); YuNgok Li, Guangdong (CN); Zhaohua Lu, Guangdong (CN); Huahua Xiao, Guangdong (CN); Yuxin Wang, Guangdong (CN); Hao Wu, Guangdong (CN); Jianxing Cai, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 40 days.

(21) Appl. No.: 17/357,280

(22) Filed: Jun. 24, 2021

(65) Prior Publication Data

US 2021/0320705 A1 Oct. 14, 2021

Related U.S. Application Data

(63) Continuation of application No. 16/089,619, filed as application No. PCT/CN2017/075895 on Mar. 7, 2017, now Pat. No. 11,082,106.

(30) Foreign Application Priority Data

Mar. 28, 2016 (CN) .......................... 201610184599.8

(51) Int. Cl.
*H04L 1/16* (2006.01)
*H04B 7/0456* (2017.01)
(Continued)

(52) U.S. Cl.
CPC ......... *H04B 7/0469* (2013.01); *H04B 7/0626* (2013.01); *H04B 7/0634* (2013.01);
(Continued)

(58) Field of Classification Search
CPC ... H04B 7/0626; H04B 7/0634; H04L 1/1642; H04L 5/0051
See application file for complete search history.

(56) References Cited

U.S. PATENT DOCUMENTS

2011/0319068 A1* 12/2011 Kim ................. H04W 72/0453
455/422.1
2013/0196675 A1 8/2013 Xiao et al.
(Continued)

FOREIGN PATENT DOCUMENTS

CN 103179664 A 6/2013
CN 103391174 A 11/2013
(Continued)

OTHER PUBLICATIONS

RP-151845,Title:Status Report toTSG; Source:Samsung; Dec. 11, 2015; pp. 1-11 (Year: 2015).*
(Continued)

*Primary Examiner* — Fahmida S Chowdhury
(74) *Attorney, Agent, or Firm* — Li & Cai Intellectual Property (USA) Office

(57) ABSTRACT

The present invention provides an information processing method, comprising: generating signaling comprising configuration information of channel state information process (CSI process); and sending the signaling comprising the configuration information of the CSI process. The present invention resolves the problem in the related art of being unable to use one CSI-RS resource overhead to meet the transmission requirements of multiple CSI-RSs having different port numbers, thereby achieving the technical effect of reducing resource overheads. The present invention also provides an information processing device and a storage medium.

16 Claims, 6 Drawing Sheets

Receive signaling including configuration information of a CSI process and transmitted by a base station — S1002

Parse the signaling including the configuration information of the CSI process — S1004

(51) Int. Cl.
*H04B 7/06* (2006.01)
*H04L 1/1607* (2023.01)
*H04L 5/00* (2006.01)
*H04L 27/26* (2006.01)

(52) U.S. Cl.
CPC .......... *H04L 1/1642* (2013.01); *H04L 5/0048* (2013.01); *H04L 5/0051* (2013.01); *H04L 27/2613* (2013.01)

(56) References Cited

U.S. PATENT DOCUMENTS

| | | | |
|---|---|---|---|
| 2014/0334391 | A1 | 11/2014 | Khoshnevis et al. |
| 2016/0036571 | A1* | 2/2016 | Park ................ H04B 7/0632 370/330 |
| 2019/0123794 | A1* | 4/2019 | Onggosanusi ....... H04B 7/0482 |

FOREIGN PATENT DOCUMENTS

| | | |
|---|---|---|
| CN | 103746779 A | 4/2014 |
| CN | 103843274 A | 6/2014 |
| CN | 104081813 A | 10/2014 |
| WO | WO2012/041016 A2 | 4/2012 |

OTHER PUBLICATIONS

R1-161465,Title:Corrections to RI-inheritance,Source: LGElectronics,Feb. 18, 2016, pp. 1-3 (Year: 2016).*
China Patent Office, first office action dated Jul. 7, 2021; Corresponding to CN Application No. 201610184599.8.
Samsung, R1-155483, "NZP CSI-RS configuration and RE mapping for class A CSI reporting", Nov. 16-22, 2015.
Samsung, R1-156781 "NZP Remaining Details on NZP CSI-RS Configuration and RE mapping for class A CSI reporting", Oct. 5-9, 2015.
NEC, RI-155278, Discussion on Dec. 16 port CSI-RS resource.
Samsung, Status Report To TSG 3GPP TSG RAN Meeting #70 RP-151845 dated Dec. 11, 2015.
LG Electronics, "Corrections to RI-inheritance",3GPP TSG-RAN WG1 Meeting #84 R1-161465 dated Feb. 18, 2016.
ZTE, "Others issues on CSI-RS Configuration", 3GPP TSG RAN WG1-Meeting #69 R1-122141 dated May 25, 2012.
WIPO, International Search Report dated Apr. 13, 2017.

* cited by examiner

INFORMATION PROCESSING METHOD AND DEVICE, AND STORAGE MEDIUM

CROSS-REFERENCE TO RELATED APPLICATIONS

This is a continuation application of U.S. patent application Ser. No. 16/089,619, filed Sep. 28, 2018, now U.S. Pat. No. 11,082,106, which is a National Phase Application filed under 35 U.S.C. 371 as a national stage of PCT/CN2017/075895 filed on Mar. 7, 2017, an application claiming the benefit to Chinese Application No. 201610184599.8, filed on Mar. 28, 2016, the content of each of which is hereby incorporated by reference in its entirety.

TECHNICAL FIELD

The disclosure relates to the field of communications, and in particular, to an information processing method and device and a storage medium.

BACKGROUND

A Cell-specific Reference Signal (CRS) can be used for channel state measurement and channel coefficient estimation during receiving and demodulation. However, as the number of ports increases, overheads increase sharply. In a case of a large number (for example, 8) of ports, the channel state measurement is performed by using a channel state information measurement reference signal (CSI-RS) with low pilot density and less overhead, rather than the CRS.

Generally, a CSI-RS resource with a relatively large number of ports is aggregated by a plurality of CSI-RS resource configurations with a relatively small number of ports. However, when it is required to transmit both a CSI-RS with a relatively large number of ports and a CSI-RS with a relatively small number of ports, in order not to consume more resources, the following solution is usually adopted: a CSI-RS with a relatively large number of ports is transmitted using a resource, and a part of the transmission signal is taken as a CSI-RS with a relatively small number of ports to be transmitted. However, since the same CSI-RS is used as an integral part of the CSI-RS with a relatively large number of ports, and also serves as the independent CSI-RS with a relatively small number of ports, there is a problem that a codeword vector in a codebook cannot reflect a spatial position and polarization attribute of such port, such that transmission requirements of a plurality of CSI-RSs with different numbers of ports cannot be satisfied using one CSI-RS resource overhead.

SUMMARY

In view of this, embodiments of the disclosure expect to provide an information processing method and apparatus and a storage medium, to solve at least the problem that transmission requirements of a plurality of CSI-RSs with different quantities of ports cannot be satisfied using one CSI-RS resource overhead in the related art.

According to an aspect of an embodiment of the disclosure, an information processing method, namely, a method for configuring a channel state information (CSI) measurement process, is provided, including: generating signaling including configuration information of a CSI process; and Transmitting the signaling including the configuration information of the CSI process, where the configuration information of the CSI process includes configuration information of a channel state information reference signal (CSI-RS) resource, the configuration information of the CSI-RS resource including: a number of ports of the CSI-RS resource, a number of CSI-RS resource configurations, a number of ports of the CSI-RS resource configurations, sequence numbers of the CSI-RS resource configurations, aggregation sequence numbers of the CSI-RS resource configurations, and a port numbering mode.

According to another aspect of an embodiment of the disclosure, an information processing apparatus, namely, an apparatus for configuring a channel state information (CSI) measurement process, is provided, including: a processing module, configured to generate signaling including configuration information of a CSI process; and a Transmitting module, configured to transmit the signaling including the configuration information of the CSI process, where the configuration information of the CSI process includes configuration information of a channel state information reference signal (CSI-RS) resource, the configuration information of the CSI-RS resource including: a number of ports of the CSI-RS resource, a number of CSI-RS resource configurations, a number of ports of the CSI-RS resource configurations, sequence numbers of the CSI-RS resource configurations, aggregation sequence numbers of the CSI-RS resource configurations, and a port numbering mode.

According to an aspect of an embodiment of the disclosure, an information processing method, namely, a method for parsing a channel state information (CSI) measurement process, is provided, including: receiving signaling including configuration information of a CSI process and transmitted by a base station; and parsing the signaling including the configuration information of the CSI process, where the configuration information of the CSI process includes configuration information of a channel state information reference signal (CSI-RS) resource, the configuration information of the CSI-RS resource including: a number of ports of the CSI-RS resource, a number of CSI-RS resource configurations, a number of ports of the CSI-RS resource configurations, sequence numbers of the CSI-RS resource configurations, aggregation sequence numbers of the CSI-RS resource configurations, and a port numbering mode.

According to another aspect of an embodiment of the disclosure, an information processing apparatus, namely, an apparatus for parsing configuration information of a channel state information (CSI) measurement process, is provided, including: a receiving module, configured to receive signaling including configuration information of a CSI process and transmitted by a base station; and a parsing module, configured to parse the signaling including the configuration information of the CSI process, where the configuration information of the CSI process includes configuration information of a channel state information reference signal (CSI-RS) resource, the configuration information of the CSI-RS resource including: a number of ports of the CSI-RS resource, a number of CSI-RS resource configurations, a number of ports of the CSI-RS resource configurations, sequence numbers of the CSI-RS resource configurations, aggregation sequence numbers of the CSI-RS resource configurations, and a port numbering mode.

An embodiment of the disclosure further provides a computer storage medium. The computer storage medium stores a computer program configured to perform the above information processing method of an embodiment of the disclosure.

According to the embodiments of the disclosure, generated signaling including configuration information of a channel state information (CSI) measurement process is used, and the signaling including the configuration information of the CSI process is sent. The configuration information of the CSI process includes configuration information of a channel state information reference signal (CSI-RS) resource, the configuration information of the CSI-RS resource including: a number of ports of the CSI-RS resource, a number of CSI-RS resource configurations, a number of ports of the CSI-RS resource configurations, sequence numbers of the CSI-RS resource configurations, and aggregation sequence numbers of the CSI-RS resource configurations, such that a codebook can accurately reflect both a spatial position and polarization attribute of the CSI-RS resource configuration and a spatial position and polarization attribute of an aggregated CSI-RS resource. Therefore, a port numbering mode in which a CSI-RS corresponding to a CSI-RS resource configuration with a relatively small number of ports and a CSI-RS corresponding to a CSI-RS resource with a relatively large number of ports can be transmitted using one CSI-RS resource overhead is used, to resolve the problem that transmission requirements of a plurality of CSI-RSs with different numbers of ports cannot be satisfied using one CSI-RS resource overhead in the related art, thereby achieving the technical effect of saving resource costs.

BRIEF DESCRIPTION OF DRAWINGS

The accompany drawings constituting a part of the application provide further understanding of the present invention. The schematic embodiments of the invention and description thereof are intended to be illustrative of the present invention and do not constitute an undue limitation of the present invention. In the accompanying drawings.

DETAILED DESCRIPTION

The disclosure is described in detail below with reference to the accompanying drawings and in conjunction with embodiments. It should be noted that the embodiments in the application and features in the embodiments may be combined with each other in a non-conflicting situation.

It should be noted that the terms "first", "second", and so on in the description and claims of embodiments of the disclosure and in the above accompanying drawings are intended to distinguish between similar objects but do not necessarily indicate a specific order or sequence.

The inventor finds in the research process that the Long Term Evolution (LTE)/LTE-Advanced (LTE-A) technology is the mainstream fourth-generation mobile communication technology (4G). The LTE/LTE-A is divided into two different duplex modes: frequency division duplex (FDD) and time division duplex (TDD). A frame structure of the frequency division duplex mode is referred to as a first type of frame structure (Frame structure type 1), and a frame structure of the time division duplex mode is referred to as a second type of frame structure (Frame structure type 2).

Figure 1:
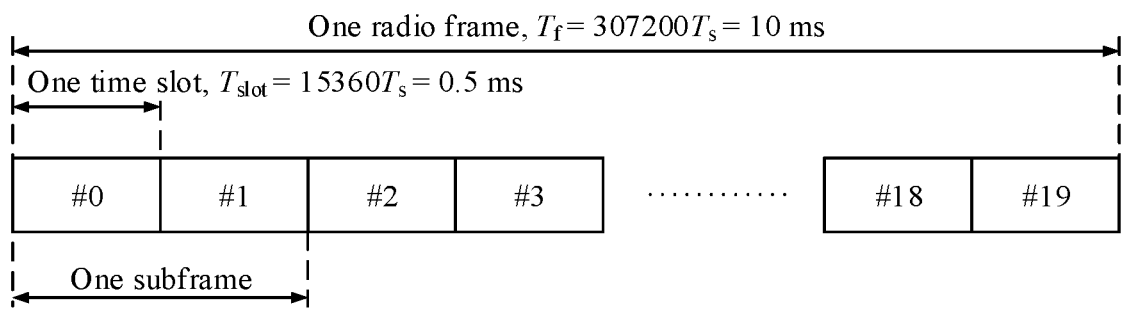
FIG. 1 is a schematic diagram of a first type of frame structure in the related art.

FIG. 1 is a schematic diagram of the first type of frame structure in the related art. As shown in FIG. 1, the first type of frame structure is illustrated as follows: each radio frame has a length of $T_f=307200 \cdot T_s=10$ ms (millisecond), and is composed of 20 time slots; a time slot has a length of $$T_{slot} = 15360 \cdot T_s = 0.5 \text{ ms}$$

(milliseconds), and is numbered from 0 to 19, where Ts is a time unit, $T_s=1/(15000 \times 2048)$ seconds; a subframe is defined as consisting of two consecutive time slots, that is, a subframe i is composed of time slots 2i and 2i+1; for the FDD duplex mode, 10 subframes are used for downlink transmission and 10 subframes are used for uplink transmission in a time interval of 10 milliseconds; uplink transmission and downlink transmission are respectively performed on different frequencies; in a half-duplex FDD mode, a terminal (user equipment, UE) cannot transmit and receive at the same time, but there is no such limitation in a full-duplex FDD mode.

Figure 2:
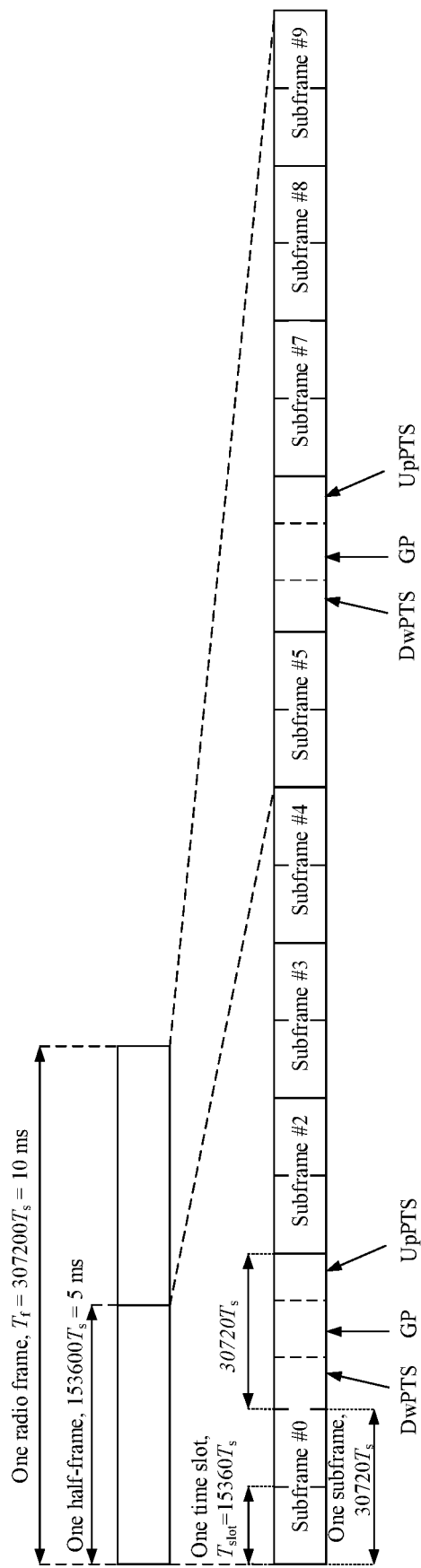
FIG. 2 is a schematic diagram of a second type of frame structure in the related art.

FIG. 2 is a schematic diagram of the second type of frame structure in the related art. As shown in FIG. 2, the second type of frame structure is illustrated as follows: each radio frame has a length of $T_f=307200 \cdot T_s=10$ ms, and is composed of two half-frames; each half frame has a length of $153600 \cdot T_s=5$ ms, and is composed of 5 subframes; each subframe has a length of $30720 \cdot T_s=1$ ms, and is defined as consisting of two slots, that is, a subframe i is composed of times slots 2i and 2i+1, and a length of the time slot is $T_{slot}=15360 \cdot T_s=0.5$ ms, where Ts is a time unit, $T_s=1/(15000 \times 2048)$ seconds.

An uplink-downlink configuration change of a cell occurs between frames, and the uplink and downlink transmission occurs on a subframe of a frame. An uplink and downlink configuration of a current frame is obtained by high-layer signaling.

There are 7 types of uplink-downlink configurations shown in Table 1. For each subframe in a radio frame, "D" marks a downlink subframe for downlink transmission, "U" marks an uplink subframe for uplink transmission, and "S" marks a special subframe. A special subframe has the following three areas: a downlink pilot time slot (DwPTS), a guard period (GP), and an uplink pilot time slot (UpPTS).

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the LTE/LTE-A technology, the downlink transmission uses an orthogonal frequency division multiplexing (OFDM) modulation technology. Data is modulated on a subcarrier in a frequency domain, and then is converted to a time domain and added with an upper cyclic prefix to form a complete time domain transmit OFDM symbol. A cyclic prefix (CP) is used to resist symbol interference generated by multipaths in the time domain and inter-subcarrier interference generated in the frequency domain. There are CPs with two lengths in the LTE/LTE-A system, one is a normal CP (NCP), and the other is an extended CP (ECP). The extended CP is applied to scenarios where multipath delays are extended. In the case of a normal CP, a subcarrier spacing is 15 kHz; in the case of an extended CP, there are two subcarrier spacings, 15 kHz and 7.5 kHz, respectively.

Signals transmitted in each time slot are described by one or more resource grids. A resource grid is composed of $N_{RB}^{DL}N_{sc}^{RB}$ subcarriers and $N_{symb}^{DL}$ OFDM symbols. $N_{RB}^{DL}$ represents a number of physical resource blocks (PRB) or resource blocks (RB), $N_{sc}^{RB}$ represents a number of subcarriers in a resource block, and $N_{symb}^{DL}$ represents a number of OFDM symbols in a time slot. Table 2 shows physical resource block parameters. The number of OFDM symbols and the number of subcarriers on one RB are shown in Table 2.

TABLE 2

| Configuration | | $N_{sc}^{RB}$ | $N_{symb}^{DL}$ |
|---|---|---|---|
| Normal cyclic prefix (NCP) | Δf = 15 kHz | 12 | 7 |
| Extended cyclic prefix (ECP) | Δf = 15 kHz | 12 | 6 |
| | Δf = 7.5 kHz | 24 | 3 |

Table 3 shows OFDM symbol parameters, and a length of a cyclic prefix is shown in Table 3.

TABLE 3

| Configuration | | Length of cyclic prefix (CP length) $N_{CP,l}$ |
|---|---|---|
| Normal cyclic prefix (NCP) | Δf = 15 | 160 for l = 0 |
| | | 144 for l = 1, 2, . . . , 6 |
| Extended cyclic prefix (ECP) | Δf = 15 | 512 for l = 0, 1, . . . , 5 |
| | Δf = 7.5 | 1024 for l = 0, 1, 2 |

The number $N_{RB}^{DL}$ of physical resource blocks is determined by a downlink transmission bandwidth configured by a cell, and the minimum value is 6 and the maximum value is 110.

A same PRB on two consecutive time slots in a same subframe is referred to as a PRB pair.

Figure 3:
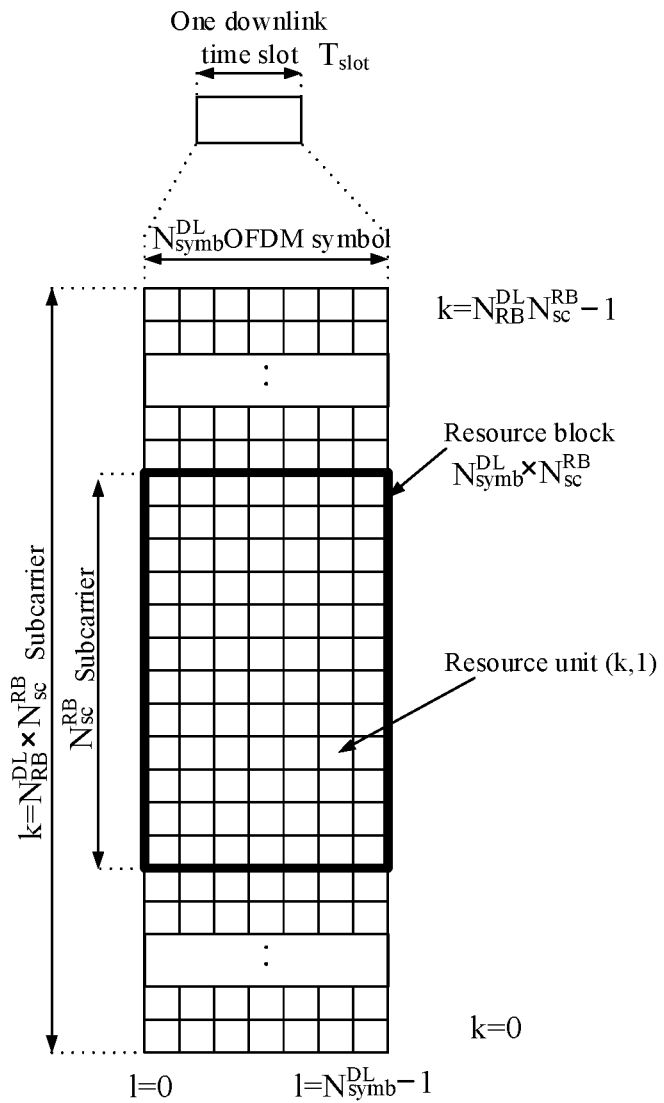
FIG. 3 is a schematic diagram of a downlink resource grid in the related art.

FIG. 3 is a schematic diagram of a downlink resource grid in the related art. As shown in FIG. 3, each unit in a resource grid is referred to as a resource element (RE), and is marked with an index pair (k,l), where $k=0, \ldots, N_{RB}^{DL}N_{sc}^{RB}-1$ represents a sequence number of a subcarrier in a frequency domain, and $$l = 0, \ldots, N_{symb}^{DL} - 1$$

represents a sequence number of an OFDM symbol in a time domain.

An antenna port is defined as a channel through which a symbol is transmitted at this antenna port, and can be speculated by a channel through which other symbols are transmitted on the same port. An antenna port is also defined with a corresponding sequence number to distinguish between antenna ports and to be used as an index of the antenna port.

A downlink physical channel corresponds to a set of resource units, and is used to carry information from an upper layer. Downlink physical information includes: a physical downlink shared channel (PDSCH), a physical multicast channel (PMCH), a physical broadcast channel (PBCH), a physical control format indicator channel (PCFICH), a physical downlink control channel (PDCCH), a physical hybrid ARQ indicator channel (PHICH), and an enhanced physical downlink control channel (EPDCCH).

A downlink physical signal corresponds to a set of resource elements, and is used by a physical layer and not used to carry upper layer information. The downlink physical signal includes: a reference signal (RS), a synchronization signal, and a discovery signal.

A reference signal is also referred to as a pilot signal, and includes the following types: a CRS, a multicast/broadcast single frequency network reference signal (MBSFN RS), a UE-specific reference signal (demodulation reference signal, (DMRS)), a positioning reference signal, and a CSI-RS. There are two types of the UE-specific reference signal: UE-specific reference signals for demodulating PDSCH (UE-specific reference signals associated with PDSCH), and UE-specific reference signals for demodulating EPDCCH (demodulation Reference Signals associated with EPDCCH).

A channel state information measurement reference signal (CSI-RS) is used by a terminal to predict a channel state. A CSI-RS transmitted using non-zero power is referred to as a non-zero power CSI-RS (NZP CSI-RS). Sometimes in order to avoid interference, it is necessary to use a CSI-RS transmitted using zero power to prevent data transmission on some REs on a PDSCH. In this case, this is referred to as a zero-power CSI-RS (ZP CSI-RS), and a corresponding resource unit set is a zero power CSI-RS resource. Sometimes, in order to achieve measure interference, a CSI-RS is transmitted using zero power, and a corresponding resource unit set is referred to as a channel state information interference measurement resource (CSI-IM Resource).

The CSI reference signal configuration (CSI-RS configuration) is used to indicate an RE mapped by the CSI-RS, that is, the RE used for transmitting the CSI-RS, and sequence numbers of the CSI-RS configuration are used to distinguish different CSI-RS configurations. A CSI reference signal subframe configuration (CSI-RS subframe configuration) is used to indicate a subframe in which a CSI-RS transmission is located.

The CSI-RS configuration is a CSI-RS configuration with a certain number of antenna ports, for example, a CSI-RS configuration with 8 antenna ports and a configuration sequence number of 0. Generally, a configuration sequence number is an index number.

Currently, a CSI-RS supports 1, 2, 4, 8, 12, and 16 ports. CSI-RS resource patterns of the number of ports are repeated on each PRB pair in a bandwidth range on a transmission subframe.

A CSI-RS resource with 1, 2, 4, and 8 ports is composed of a single CSI-RS resource, and a CSI-RS resource with 12 and 16 ports is aggregated by multiple CSI-RS resource configurations.

A base station or a terminal usually measures a channel state through a channel state information measurement process (CSI Process). One or more CSI-RS resources are usually configured in one CSI process, and the terminal feeds back according to the measurement of the CSI-RS.

Figure 4:
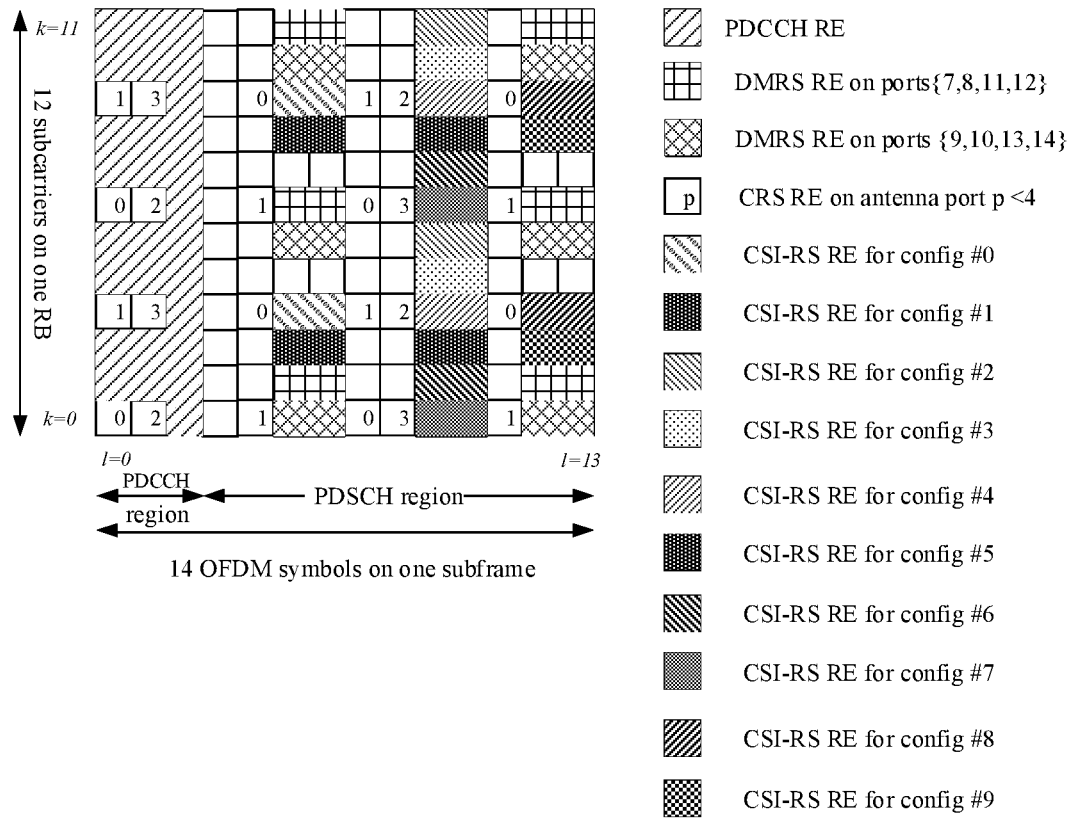
FIG. 4 is a schematic diagram of a resource pattern of a CSI-RS with 4 ports on one RB pair in the related art.
Figure 5:
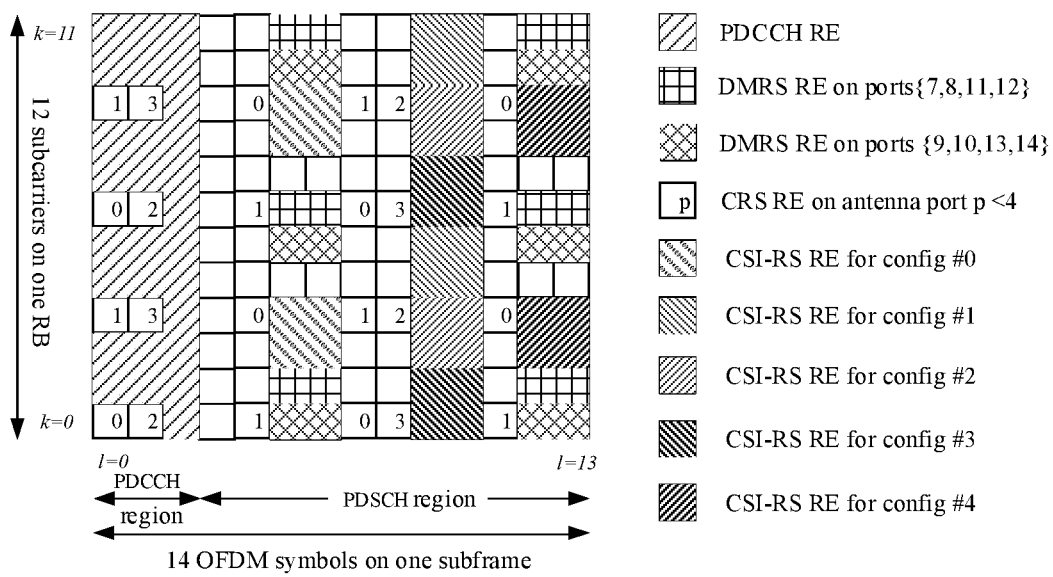
FIG. 5 is a schematic diagram of a resource pattern of a CSI-RS with 8 ports on one RB pair in the related art.

FIG. 4 is a schematic diagram of a resource pattern of a CSI-RS with 4 ports on one RB pair in the related art; and FIG. 5 is a schematic diagram of a resource pattern of a CSI-RS with 8 ports on one RB pair in the related art.

To make full use of power and improve the accuracy of channel measurement, the ports are divided into multiple groups, and ports in the group are code division multiplexed.

The base station informs the terminal of information of the CSI-RS by using upper layer signaling, and the information includes: a CSI-RS resource configuration identifier, a number of ports of the CSI-RS, a CSI-RS resource configuration, and a CSI-RS subframe configuration.

However, as the number of ports increases, the overhead increases sharply. When there are 8 ports, the channel state measurement is performed by using a CSI-RS rather than a CRS. However, with the development of technology and demand, it needs to further develop technologies for a larger number of antenna ports, for example, 20, 24, 28, and 32 ports. This involves channel state measurements of these ports, but CSI-RS transmission with more than 16 ports cannot be supported currently.

Generally, a CSI-RS resource with a relatively large number of ports is aggregated by a plurality of CSI-RS resource configurations with a relatively small number of ports. The following requirements usually exist: it is required to transmit both a CSI-RS with a relatively large number of ports and a CSI-RS with a relatively small number of ports. One solution: a CSI-RS with a relatively large number of ports is transmitted using a resource, and a CSI-RS with a relatively small number of ports is transmitted using another resource. Another solution: a CSI-RS with a relatively large number of ports is transmitted using a resource, and an integral part of the transmission signal is used for transmitting a CSI-RS with a relatively small number of ports. Such solution has advantages of saving resource overhead, but has disadvantages: the same CSI-RS is used as an integral part of the CSI-RS with a relatively large number of ports, and also serves as the independent CSI-RS with a relatively small number of ports; as a result, there is a problem that a codeword vector in a codebook cannot reflect a spatial position and polarization attribute of such port, such that a codeword in the codebook cannot reflect a channel coefficient of such antenna port. That is, solution 2 cannot satisfy transmission requirements of a plurality of CSI-RSs with different quantities of ports using one CSI-RS resource overhead.

The problem of solution 2 is illustrated by taking an example of a CSI-RS signal with 16 ports and a CSI-RS signal with 8 ports.

Figure 6:
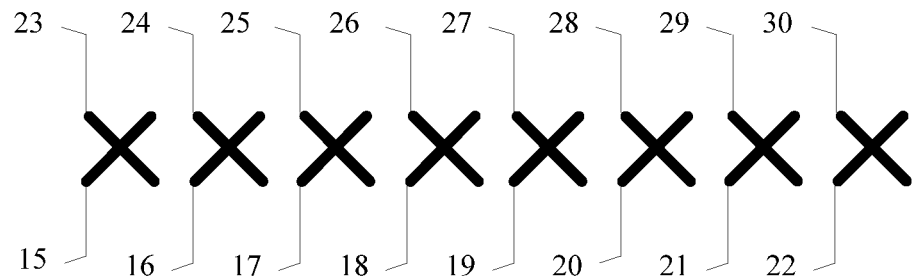
FIG. 6 is a schematic diagram of a port antenna spatial position and polarization attribute corresponding to a CSI-RS with 16 ports in the related art.

FIG. 6 is a schematic diagram of a port antenna spatial position and polarization attribute corresponding to a CSI-RS with 16 ports in the related art. FIG. 6 shows a corresponding port antenna spatial position and polarization attribute of a CSI-RS with 16 ports. The 1st to 16th elements of a column vector in a codeword of a feedback channel coefficient correspond to ports 15 to 30.

Figure 7:
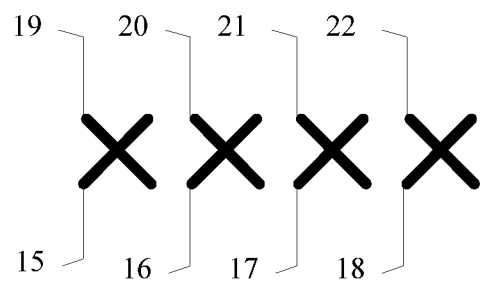
FIG. 7 is a schematic diagram of a port antenna spatial position and polarization attribute corresponding to a CSI-RS with 8 ports in the related art.

FIG. 7 is a schematic diagram of a port antenna spatial position and polarization attribute corresponding to a CSI-RS with 8 ports in the related art. FIG. 7 shows a corresponding port antenna spatial position and polarization attribute of a CSI-RS with 8 ports. The 1st to 8th elements of a column vector in a codeword of a feedback channel coefficient correspond to ports 15 to 22.

Figure 8:
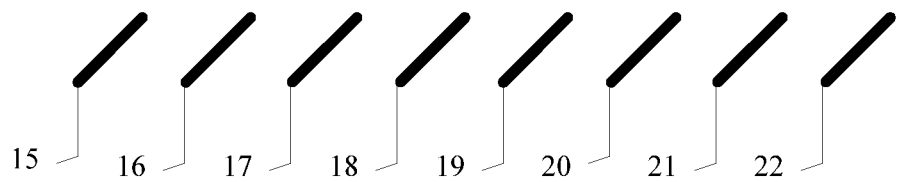
FIG. 8 is a schematic diagram of a port antenna spatial position and polarization attribute corresponding to an integral part with 8 ports that is extracted from a CSI-RS with a configuration of 16 ports in the related art.

FIG. 8 is a schematic diagram of a port antenna spatial position and polarization attribute corresponding to an integral part with 8 ports that is extracted from a CSI-RS with a configuration of 16 ports in the related art. FIG. 8 shows a corresponding port antenna spatial position and polarization attribute of an integral part with 8 ports that is extracted from a CSI-RS with a configuration of 16 ports.

The spatial position and polarization attribute of such port is inconsistent with a port spatial position and polarization attribute corresponding to an 8-antenna port codeword column vector element, that is, the 8-antenna port codeword column vector cannot reflect the channel coefficient of such port antenna.

The related art has the following problems: a port spatial position and polarization attribute of an aggregated CSI-RS resource and a port spatial position and polarization attribute of a CSI-RS resource configuration participating in the aggregation cannot be correctly reflected by respective codebooks; thus, transmission requirements of a plurality of CSI-RSs with different quantities of ports cannot be satisfied using one CSI-RS resource overhead.

Figure 9:
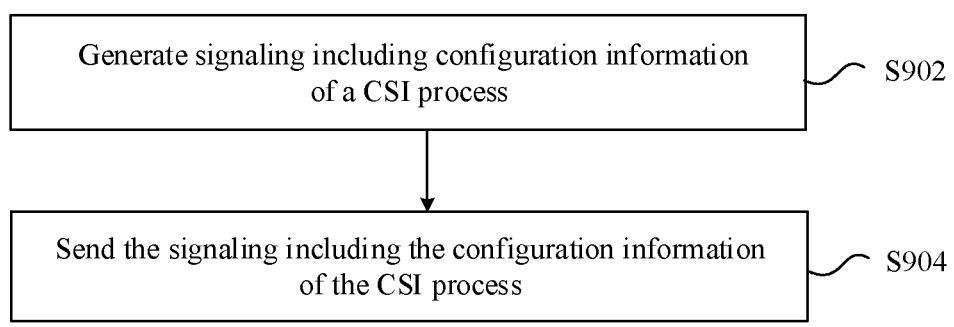
FIG. 9 is a flowchart of a method for configuring a channel state information measurement process of an embodiment of the disclosure.

In this embodiment, a method for configuring a channel state information measurement process is provided. FIG. 9 is a flowchart of a method for configuring a channel state information measurement process of an embodiment of the disclosure, which may be applied to a network side network element, such as a base station. As shown in FIG. 9, the process includes the following steps.

Step 902: Generate signaling including configuration information of a channel state information (CSI) measurement process.

Here, this step also determines the configuration information of the CSI process.

Step 904: transmit the signaling including the configuration information of the CSI process.

In one embodiment, signaling or bearer data including the configuration information may also be generated, and the configuration information of the CSI process is transmitted by the signaling or bearer data.

The configuration information of the CSI process includes at least one of the following information: configuration information of a channel state information reference signal (CSI-RS) resource, the configuration information of the CSI-RS resource including: a number of ports of the CSI-RS resource, a number of CSI-RS resource configurations, a number of ports of the CSI-RS resource configurations, sequence numbers of the CSI-RS resource configurations, aggregation sequence numbers of the CSI-RS resource configurations, and a port numbering mode.

According to this embodiment, the configuration information of the channel state information (CSI) measurement process is determined, and the configuration information of the CSI process is sent. The configuration information of the CSI process includes configuration information of a channel state information reference signal (CSI-RS) resource, the configuration information of the CSI-RS resource including: a number of ports of the CSI-RS resource, a number of CSI-RS resource configurations, a number of ports of the CSI-RS resource configurations, sequence numbers of the CSI-RS resource configurations, and aggregation sequence numbers of the CSI-RS resource configurations, such that a codebook can accurately reflect both a spatial position and polarization attribute of the CSI-RS resource configuration and a spatial position and polarization attribute of an aggregated CSI-RS resource. Therefore, a port numbering mode in which a CSI-RS corresponding to a CSI-RS resource configuration with a relatively small number of ports and a CSI-RS corresponding to a CSI-RS resource with a relatively large number of ports can be transmitted using one CSI-RS resource overhead is used, to resolve the problem that transmission requirements of a plurality of CSI-RSs with different quantities of ports cannot be satisfied using one CSI-RS resource overhead in the related art, thereby achieving the technical effect of saving resource costs.

An optional implementation of the embodiment is: a candidate mode of the port numbering mode includes but is not limited to:

Mode 1: all the ports of the CSI-RS resource configurations are arranged in ascending order of the aggregation sequence numbers of the CSI-RS resource configurations, and the ports are consecutively numbered according to an arrangement order.

Mode 2: top-numbered half ports of each CSI-RS resource configuration are sorted as the first half ports in ascending order of the aggregation sequence numbers of the CSI-RS resource configurations, and bottom-numbered half ports of each CSI-RS resource configuration are sorted as the latter half ports in ascending order of the aggregation sequence numbers of the CSI-RS resource configurations; and the ports are consecutively numbered according to the arrangement order. The number of the ports of the CSI-RS resource configurations is an even number.

Mode 3: all the ports extracted one by one from the CSI-RS resource configurations in turn in ascending order of port numbers are arranged in ascending order of the aggregation sequence numbers of the CSI-RS resource configurations; and the ports are consecutively numbered according to the arrangement order.

Another implementation of the embodiment is: the number of the ports of the CSI-RS resource is divided into a first set and a second set, where ports of the CSI-RS resource corresponding to a first set use a first type of port numbering mode, ports of the CSI-RS resource in a second set use a second type of port numbering mode, and the first type of port numbering mode is different from the second type of port numbering mode.

It should be noted that the port numbering mode is related to the number of the ports of the CSI-RS resource, and the number of the ports of the CSI-RS resource indicates the port numbering mode.

Another implementation of the embodiment is: the number of the ports of the CSI-RS resource is divided into a first set and a second set, where ports of the CSI-RS resource corresponding to a first set use a first type of port numbering mode, ports of the CSI-RS resource corresponding to a second set use a second type of port numbering mode, and the first type of port numbering mode is different from the second type of port numbering mode.

It should be noted that the port numbering mode is related to the number of ports of the CSI-RS resource, and the number of the ports of the CSI-RS resource indicates the port numbering mode. A codebook can accurately reflect both a port spatial position and polarization attribute of the CSI-RS resource configuration and a spatial position and polarization attribute of the CSI-RS resource when a corresponding number of ports of the CSI-RS resource and port numbering mode are used.

Another implementation of the embodiment is: the number of the ports of the CSI-RS resource configurations is divided into a first set and a second set, where ports of the CSI-RS resource corresponding to a first set use a first type of port numbering mode, ports of the CSI-RS resource corresponding to a second set use a second type of port numbering mode, and the first type of port numbering mode is different from the second type of port numbering mode.

It should be noted that the port numbering mode is related to the number of the ports of the CSI-RS resource configurations, and the number of the ports of the CSI-RS resource configurations indicates the port numbering mode. A codebook can accurately reflect both a port spatial position and polarization attribute of the CSI-RS resource configuration and a spatial position and polarization attribute of the CSI-RS resource when a corresponding number of ports of the CSI-RS resource configurations and port numbering mode are used.

Another implementation of the embodiment is: an array (the number of the ports of the CSI-RS resource configurations, the number of the CSI-RS resource configurations) is divided into a first set and a second set, where ports of the CSI-RS resource corresponding to a first set use a first type of port numbering mode, ports of the CSI-RS resource corresponding to a second set use a second type of port numbering mode, and the first type of port numbering mode is different from the second type of port numbering mode.

It should be noted that the port numbering mode is related to the array (the number of the ports of the CSI-RS resource configurations, the number of the CSI-RS resource configurations), and the array indicates the port numbering mode. A codebook can accurately reflect both a port spatial position and polarization attribute of the CSI-RS resource configuration and a spatial position and polarization attribute of the CSI-RS resource when an array and a port numbering mode are corresponding to each other.

Another implementation of the embodiment is: the configuration information of the CSI process further includes information for indicating that a CSI-RS is periodic or aperiodic, where ports of the CSI-RS resource corresponding to a periodic CSI-RS use a first type of port numbering mode, ports of the CSI-RS resource corresponding to an aperiodic CSI-RS use a second type of port numbering mode, and the first type of port numbering mode is different from the second type of port numbering mode.

It should be noted that the port numbering mode is related to a period attribute of the CSI-RS, and the period attribute of the CSI-RS indicates the port numbering mode.

Another implementation of the embodiment is: the configuration information of the CSI process further includes information of a codebook configuration mode, where the codebook configuration mode is divided into a first set and a second set, ports of the CSI-RS resource corresponding to a first set use a first type of port numbering mode, ports of the CSI-RS resource corresponding to a second set use a second type of port numbering mode, and the first type of port numbering mode is different from the second type of port numbering mode.

It should be noted that the port numbering mode is related to the codebook configuration mode, and the codebook configuration mode indicates the port numbering mode.

Another optional implementation of the embodiment is: the configuration information of the CSI process further includes information of a correspondence manner of the ports of the CSI-RS resource and codeword column vector elements.

It should be noted that a codebook can accurately reflect both a port spatial position and polarization attribute of the CSI-RS resource configuration and a spatial position and polarization attribute of the CSI-RS resource by indicating the correspondence manner of the ports of the CSI-RS resource and codeword column vector elements.

Another implementation of the embodiment is: the correspondence manner of the ports of the CSI-RS resource and the codeword column vector elements is divided into a first set and a second set, where ports of the CSI-RS resource corresponding to a first set use a first type of port numbering mode, ports of the CSI-RS resource corresponding to a second set use a second type of port numbering mode, and the first type of port numbering mode is different from the second type of port numbering mode.

It should be noted that the correspondence manner of the ports of the CSI-RS resource and the codeword column vector elements indicates the port numbering mode. A codebook can accurately reflect both a port spatial position and polarization attribute of the CSI-RS resource configuration and a spatial position and polarization attribute of the CSI-RS resource by using the correspondence manner of the ports of the CSI-RS resource and the codeword column vector elements.

Another optional implementation of the embodiment is: a candidate mode of the correspondence manner of the ports of the CSI-RS resource and the codeword column vector elements includes at least one of the following:

Mode 1: the port numbers in ascending order are in one-to-one correspondence with the codeword column vector elements in ascending order.

Mode 2: N/2 consecutive port numbers in ascending order are classified as one group, with 2K groups in total, and all the groups are numbered in ascending order; N/2 consecutive codeword column vector element numbers in ascending order are classified as one group, with 2K groups in total, and all the groups are numbered in ascending order; K even-numbered port groups are in one-to-one correspondence with K top-numbered codeword column vector element groups in ascending order, and K odd-numbered port groups are in one-to-one correspondence with K bottom-numbered codeword column vector element groups in ascending order; alternatively, K even-numbered port groups are in one-to-one correspondence with K bottom-numbered codeword column vector element groups in ascending order, and K odd-numbered port groups are in one-to-one correspondence with K top-numbered codeword column vector element groups in ascending order, where K is the number of the CSI-RS resource configurations, and N is the number of the ports of the CSI-RS resource configurations.

Mode 3: N/2 consecutive port numbers in ascending order are classified as one group, with 2K groups in total, and all the groups are numbered in ascending order; N/2 consecutive codeword column vector element numbers in ascending order are classified as one group, with 2K groups in total, and all the groups are numbered in ascending order; K even-numbered codeword column vector element groups are in one-to-one correspondence with K top-numbered port groups in ascending order, and K odd-numbered codeword column vector element groups are in one-to-one correspondence with K bottom-numbered port groups in ascending order; alternatively, K even-numbered codeword column vector element groups are in one-to-one correspondence with K bottom-numbered port groups in ascending order, and K odd-numbered codeword column vector element groups are in one-to-one correspondence with K top-numbered port groups in ascending order, where K is the number of the CSI-RS resource configurations, and N is the number of the ports of the CSI-RS resource configurations.

Mode 4: N consecutive port numbers in ascending order are classified as one group, with K groups in total, and all the groups are numbered in ascending order; N codeword column vector elements spaced by K elements in ascending order are classified as one group, with K groups in total, and all the groups are consecutively numbered in ascending order; and the port number groups are in one-to-one correspondence with the codeword column vector element group numbers in ascending order, where K is the number of the CSI-RS resource configurations, and N is the number of the ports of the CSI-RS resource configurations.

Mode 5: top-numbered half ports of each CSI-RS resource configuration are arranged into one group in ascending order of the aggregation sequence numbers of the CSI-RS resource configurations, and are in one-to-one correspondence with odd numbers of the code word column vector elements in ascending order; and bottom-numbered half ports of each CSI-RS resource configuration are arranged into another group in ascending order of the aggregation sequence numbers of the CSI-RS resource configurations, and are in one-to-one correspondence with even numbers of the code word column vector elements; alternatively, top-numbered half ports of each CSI-RS resource configuration are arranged into one group in ascending order of the aggregation sequence numbers of the CSI-RS resource configurations, and are in one-to-one correspondence with even numbers of the code word column vector elements in ascending order; and bottom-numbered half ports of each CSI-RS resource configuration are arranged into another group in ascending order of the aggregation sequence numbers of the CSI-RS resource configurations, and are in one-to-one correspondence with odd numbers of the code word column vector elements.

Another implementation of the embodiment is: the configuration information of the CSI-RS resource further includes a port code division multiplexing type, where the port code division multiplexing type is divided into a first set and a second set, ports of the CSI-RS resource corresponding to a first set use a first type mode to correspond to code word column vector elements, ports of the CSI-RS resource corresponding to a second set use a second type mode to correspond to the code word column vector elements, and the first type mode is different from the second type mode.

It should be noted that the port code division multiplexing type indicates a correspondence manner of the ports of the CSI-RS resource and the codeword column vector elements.

Another implementation of the embodiment is: the number of the ports of the CSI-RS resource is divided into a first set and a second set, ports of the CSI-RS resource corresponding to a first set use a first type mode to correspond to code word column vector elements, ports of the CSI-RS resource corresponding to a second set use a second type mode to correspond to the code word column vector elements, and the first type mode is different from the second type mode.

It should be noted that the number of the ports of the CSI-RS resource indicates a correspondence manner of the ports of the CSI-RS resource and the codeword column vector elements.

Another implementation of the embodiment is: the number of the ports of the CSI-RS resource is divided into a first set and a second set, ports of the CSI-RS resource corresponding to a first set use a first type mode to correspond to code word column vector elements, ports of the CSI-RS resource corresponding to a second set use the first type mode or a second type mode to correspond to the code word column vector elements, and the first type of port numbering mode is different from the second type of port numbering mode.

It should be noted that the number of the ports of the CSI-RS resource indicates a correspondence manner of the ports of the CSI-RS resource and the codeword column vector elements.

Another implementation of the embodiment is: the number of the ports of the CSI-RS resource configurations is divided into a first set and a second set, ports of the CSI-RS resource corresponding to a first set use a first type mode to correspond to code word column vector elements, ports of the CSI-RS resource corresponding to a second set use a second type mode to correspond to the code word column vector elements, and the first type mode is different from the second type mode.

It should be noted that the number of the ports of the CSI-RS resource configurations indicates a correspondence manner of the ports of the CSI-RS resource and the codeword column vector elements.

Another implementation of the embodiment is: an array (the number of the ports of the CSI-RS resource configuration, the number of the CSI-RS resource configurations) is divided into a first set and a second set, ports of the CSI-RS resource corresponding to a first set use a first type mode to correspond to code word column vector elements, ports of the CSI-RS resource corresponding to a second set use a second type mode to correspond to the code word column vector elements, and the first type mode is different from the second type mode.

It should be noted that the array (the number of the ports of the CSI-RS resource configuration, the number of the CSI-RS resource configurations) indicates a correspondence manner of the ports of the CSI-RS resource and the codeword column vector elements.

Another implementation of the embodiment is: the configuration information of the CSI process further includes information for indicating that a CSI-RS is periodic or aperiodic, where ports of the CSI-RS resource corresponding to a periodic CSI-RS use a first type mode to correspond to code word column vector elements, ports of the CSI-RS resource corresponding to an aperiodic CSI-RS use a second type mode to correspond to the code word column vector elements, and the first type mode is different from the second type mode.

It should be noted that a period attribute of the CSI-RS indicates a correspondence manner of the ports of the CSI-RS resource and the codeword column vector elements.

Another implementation of the embodiment is: the configuration information of the CSI-RS measurement process further includes information of a codebook configuration mode, where the codebook configuration mode is divided into a first set and a second set, ports of the CSI-RS resource corresponding to a first set use a first type mode to correspond to code word column vector elements, ports of the CSI-RS resource corresponding to a second set use a second type mode to correspond to the code word column vector elements, and the first type mode is different from the second type mode.

It should be noted that the codebook configuration mode indicates a correspondence manner of the ports of the CSI-RS resource and the codeword column vector elements.

Another implementation of the embodiment is: the port numbering mode of the CSI-RS resource is divided into a first set and a second set, ports of the CSI-RS resource corresponding to a first set use a first type mode to correspond to code word column vector elements, ports of the CSI-RS resource corresponding to a second set use a second type mode to correspond to the code word column vector elements, and the first type mode is different from the second type mode.

It should be noted that the port numbering mode of the CSI-RS resource indicates a correspondence manner of the ports of the CSI-RS resource and the codeword column vector elements.

Figure 10:
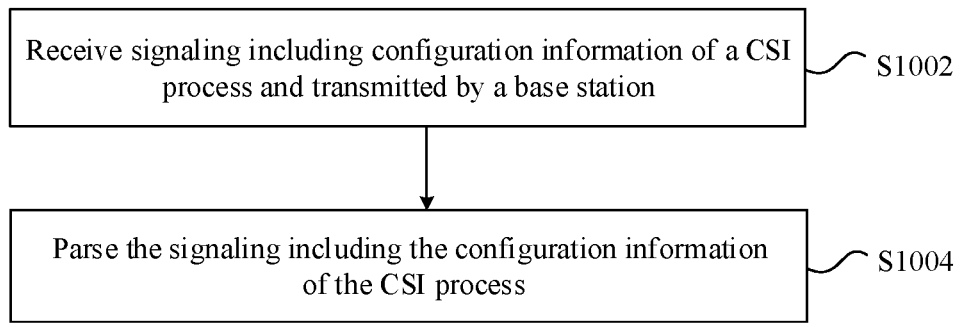
FIG. 10 is a flowchart of a method for parsing a channel state information measurement process of an embodiment of the disclosure.

FIG. 10 is a flowchart of a method for parsing a channel state information measurement process according to an embodiment of the disclosure, and the method may be applied to a terminal side. As shown in FIG. 10, the method includes the following steps.

Step S1002: Receive signaling including configuration information of a channel state information (CSI) measurement process and transmitted by a base station;

Step S1004: Parse the signaling including the configuration information of the CSI process.

The configuration information of the CSI process includes at least one of the following information: configuration information of a channel state information reference signal (CSI-RS) resource, the configuration information of the CSI-RS resource including: a number of ports of the CSI-RS resource, a number of CSI-RS resource configurations, a number of ports of the CSI-RS resource configurations, sequence numbers of the CSI-RS resource configurations, aggregation sequence numbers of the CSI-RS resource configurations, and a port numbering mode.

By means of the above description of the embodiments, those skilled in the art can clearly understand that the above method in the embodiments may be implemented by means of software and a necessary general-purpose hardware platform. Certainly, the hardware may be used, but the former is a better implementation manner in many cases. Based on this understanding, the technical solution of the embodiments of the disclosure essentially, or a part contributing to the prior art, may be embodied in a form of a software product. The computer software product is stored on a storage medium (such as a ROM/RAM, a magnetic disk, an optical disk), and includes several instructions to enable a terminal device (may be a mobile phone, a computer, a server, or a network device) to execute the method according to each embodiment of the present invention.

Embodiments of the disclosure further provide an apparatus for configuring a channel state information (CSI) measurement process, which is configured to achieve the above embodiments and preferred implement modes, which have been illustrated and are not described again. As used below, the term "module" may implement the combination of software and/or hardware having predetermined functions. Although the apparatus described in the following embodiments is preferably implemented by software, implementation by hardware or the combination of the software and the hardware is also possible and may be conceived.

Figure 11:
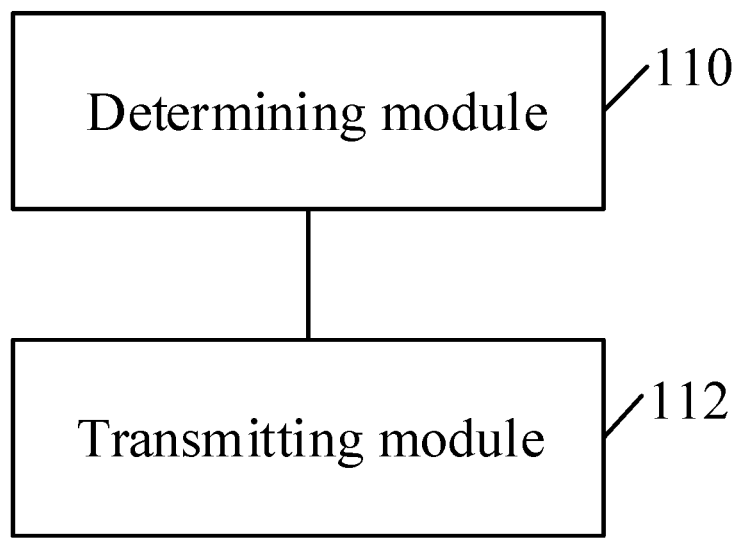
FIG. 11 is a structural block diagram of an apparatus for configuring a channel state information (CSI) measurement process of an embodiment of the disclosure.

FIG. 11 is a structural block diagram of an apparatus for configuring a channel state information (CSI) measurement process according to an embodiment of the disclosure. As shown in FIG. 11, the apparatus includes a processing module 110 and a Transmitting module 112.

The processing module 110 is configured to generate signaling including configuration information of a channel state information (CSI) measurement process.

The Transmitting module 112 is configured to transmit the signaling including the configuration information of the CSI process.

The configuration information of the CSI process includes at least one of the following information: configuration information of a channel state information reference signal (CSI-RS) resource, the configuration information of the CSI-RS resource including: a number of ports of the CSI-RS resource, a number of CSI-RS resource configurations, a number of ports of the CSI-RS resource configurations, sequence numbers of the CSI-RS resource configurations, aggregation sequence numbers of the CSI-RS resource configurations, and a port numbering mode.

Figure 12:
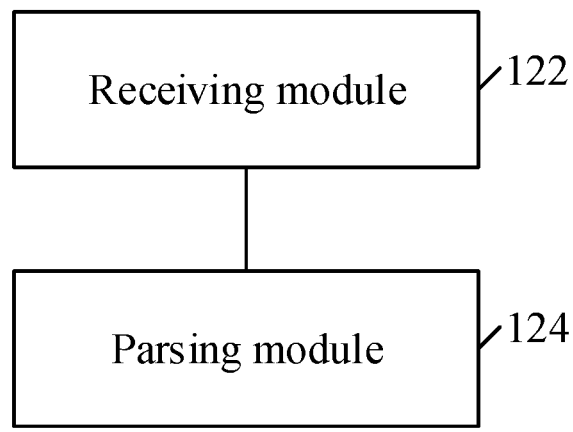
FIG. 12 is a structural block diagram of an apparatus for parsing configuration information of a channel state information measurement process of an embodiment of the disclosure.

FIG. 12 is a structural block diagram of an apparatus for parsing configuration information of a channel state information measurement process according to an embodiment of the disclosure. As shown in FIG. 12, the apparatus includes a receiving module 122 and a parsing module 124.

The receiving module 122 is configured to receive signaling including configuration information of a channel state information (CSI) measurement process.

The parsing module 124 is configured to parse the signaling including the configuration information of the CSI process.

The configuration information includes at least one of the following information: configuration information of a channel state information reference signal (CSI-RS) resource, the configuration information of the CSI-RS resource including: a number of ports of the CSI-RS resource, a number of CSI-RS resource configurations, a number of ports of the CSI-RS resource configurations, sequence numbers of the CSI-RS resource configurations, aggregation sequence numbers of the CSI-RS resource configurations, and a port numbering mode.

It should be noted that each of the above modules may be implemented by software or hardware. For the latter, the modules may be implemented by, but not limited to, the modules are all located in the same processor, or the modules are separately located in multiple processors.

The disclosure is described by means of a plurality of optional embodiments:

Embodiment 1

In this embodiment, a base station first determines configuration information of a CSI process, generates signaling including the configuration information of the CSI process, and then transmits the signaling including the configuration information of the CSI process. For example, a bit denotes information of a number of ports, b bit denotes a number of CSI-RS resource configurations, c bit denotes the number of the ports of the CSI-RS resource configurations, d bit denotes sequence numbers of the CSI-RS resource configurations, e bit denotes aggregation sequence numbers of the CSI-RS resource configurations, and f bit denotes a port numbering mode, where a+b+c+d+e+f=X.

Alternatively, a bit denotes information of the number of ports, b bit denotes the number of CSI-RS resource configurations, c bit denotes the number of the ports of the CSI-RS resource configurations, d bit denotes a joint coding of sequence numbers of the CSI-RS resource configurations and aggregation sequence numbers of the CSI-RS resource configurations, and e bit denotes a port numbering mode, where a+b+c+d+e=X.

Alternatively, a bit denotes a joint coding of information of the number of ports, the number of CSI-RS resource configurations, and the number of the ports of the CSI-RS resource configurations, b bit denotes a joint coding of sequence numbers of the CSI-RS resource configurations and aggregation sequence numbers of the CSI-RS resource configurations, and c bit denotes a port numbering mode, where a+b+c=X.

Alternatively, a bit denotes a joint coding of information of the number of ports, the number of CSI-RS resource configurations, the number of the ports of the CSI-RS resource configurations, and a port numbering mode, and b bit denotes a joint coding of sequence numbers of the CSI-RS resource configurations and aggregation sequence numbers of the CSI-RS resource configurations, where a+b=X.

Alternatively, a bit denotes a joint coding of information of the number of ports and a port numbering mode, b bit denotes the number of CSI-RS resource configurations, c bit denotes the number of the ports of the CSI-RS resource configurations, d bit denotes sequence numbers of the CSI-RS resource configurations, and e bit denotes aggregation sequence numbers of the CSI-RS resource configurations, where a+b+c+d+e=X.

Alternatively, X bit denotes a joint coding of information of the number of ports, the number of CSI-RS resource configurations, the number of the ports of the CSI-RS resource configurations, sequence numbers of the CSI-RS resource configurations, aggregation sequence numbers of the CSI-RS resource configurations, and a port numbering mode.

The number of ports can be a value of {20, 24, 28, 32}, the number of the ports of the CSI-RS resource configurations can be a value of {4, 8}, and the number of CSI-RS resource configurations can be a value of {3, 4, 5, 6, 7}.

Embodiment 2

In this embodiment, a candidate mode of the port numbering mode includes at least one of the following.

Mode 1: all the ports of the CSI-RS resource configurations are arranged in ascending order of the aggregation sequence numbers of the CSI-RS resource configurations, and the ports are consecutively numbered according to an arrangement order.

Mode 2: top-numbered half ports of each CSI-RS resource configuration are sorted as the first half ports in ascending order of the aggregation sequence numbers of the CSI-RS resource configurations, and bottom-numbered half ports of each CSI-RS resource configuration are sorted as the latter half ports in ascending order of the aggregation sequence numbers of the CSI-RS resource configurations; and the ports are consecutively numbered according to the arrangement order.

Mode 3: all the ports extracted one by one from the CSI-RS resource configurations in turn in ascending order of port numbers are arranged in ascending order of the aggregation sequence numbers of the CSI-RS resource configurations; and the ports are consecutively numbered according to the arrangement order.

For example, according to Mode 1, four CSI-RS resource configurations with 8 ports respectively are aggregated into a port number of the CSI-RS with 32 ports, as shown in Table 4:

TABLE 4

| Aggregation sequence numbers of CSI-RS resource configurations | Port numbers of CSI-RS resource configurations | Aggregated port number |
|---|---|---|
| 0 | 15 | 15 |
|   | 16 | 16 |
|   | 17 | 17 |
|   | 18 | 18 |
|   | 19 | 19 |
|   | 20 | 20 |
|   | 21 | 21 |
|   | 22 | 22 |
| 1 | 15 | 23 |
|   | 16 | 24 |
|   | 17 | 25 |
|   | 18 | 26 |
|   | 19 | 27 |
|   | 20 | 28 |
|   | 21 | 29 |
|   | 22 | 30 |
| 2 | 15 | 31 |
|   | 16 | 32 |
|   | 17 | 33 |
|   | 18 | 34 |
|   | 19 | 35 |
|   | 20 | 36 |
|   | 21 | 37 |
|   | 22 | 38 |
| 3 | 15 | 39 |
|   | 16 | 40 |
|   | 17 | 41 |
|   | 18 | 42 |
|   | 19 | 43 |
|   | 20 | 44 |
|   | 21 | 45 |
|   | 22 | 46 |

According to Mode 1, five CSI-RS resource configurations with 4 ports respectively are aggregated into a port number of the CSI-RS with 20 ports, as shown in Table 5:

TABLE 5

| Aggregation sequence numbers of CSI-RS resource configurations | Port numbers of CSI-RS resource configurations | Aggregated port number |
|---|---|---|
| 0 | 15 | 15 |
|   | 16 | 16 |
|   | 17 | 17 |
|   | 18 | 18 |
| 1 | 15 | 19 |
|   | 16 | 20 |
|   | 17 | 21 |
|   | 18 | 22 |
| 2 | 15 | 23 |
|   | 16 | 24 |
|   | 17 | 25 |
|   | 18 | 26 |
| 3 | 15 | 27 |
|   | 16 | 28 |
|   | 17 | 29 |
|   | 18 | 30 |
| 4 | 15 | 31 |
|   | 16 | 32 |
|   | 17 | 33 |
|   | 18 | 34 |

According to Mode 2, four CSI-RS resource configurations with 8 ports respectively are aggregated into a port number of the CSI-RS with 32 ports, as shown in Table 6:

TABLE 6

| Aggregation sequence numbers of CSI-RS resource configurations | Port numbers of CSI-RS resource configurations | Aggregated port number |
|---|---|---|
| 0 | 15 | 15 |
|   | 16 | 16 |
|   | 17 | 17 |
|   | 18 | 18 |
| 1 | 15 | 19 |
|   | 16 | 20 |
|   | 17 | 21 |
|   | 18 | 22 |
| 2 | 15 | 23 |
|   | 16 | 24 |
|   | 17 | 25 |
|   | 18 | 26 |
| 3 | 15 | 27 |
|   | 16 | 28 |
|   | 17 | 29 |
|   | 18 | 30 |
| 0 | 19 | 31 |
|   | 20 | 32 |
|   | 21 | 33 |
|   | 22 | 34 |
| 1 | 19 | 35 |
|   | 20 | 36 |
|   | 21 | 37 |
|   | 22 | 38 |
| 2 | 19 | 39 |
|   | 20 | 40 |
|   | 21 | 41 |
|   | 22 | 42 |
| 3 | 19 | 43 |
|   | 20 | 44 |
|   | 21 | 45 |
|   | 22 | 46 |

According to Mode 2, five CSI-RS resource configurations with 4 ports respectively are aggregated into a port number of the CSI-RS with 20 ports, as shown in Table 7:

TABLE 7

| Aggregation sequence numbers of CSI-RS resource configurations | Port numbers of CSI-RS resource configurations | Aggregated port number |
|---|---|---|
| 0 | 15 | 15 |
|   | 16 | 16 |
| 1 | 15 | 17 |
|   | 16 | 18 |
| 2 | 15 | 19 |
|   | 16 | 20 |
| 3 | 15 | 21 |
|   | 16 | 22 |
| 4 | 15 | 23 |
|   | 16 | 24 |
| 0 | 17 | 25 |
|   | 18 | 26 |
| 1 | 17 | 27 |
|   | 18 | 28 |
| 2 | 17 | 29 |
|   | 18 | 30 |
| 3 | 17 | 31 |
|   | 18 | 32 |
| 4 | 17 | 33 |
|   | 18 | 34 |

According to Mode 3, four CSI-RS resource configurations with 8 ports respectively are aggregated into a port number of the CSI-RS with 32 ports, as shown in Table 8:

TABLE 8

| Aggregation sequence numbers of CSI-RS resource configurations | Port numbers of CSI-RS resource configurations | Aggregated port number |
|---|---|---|
| 0 | 15 | 15 |
| 1 | 15 | 16 |
| 2 | 15 | 17 |
| 3 | 15 | 18 |
| 0 | 16 | 19 |
| 1 | 16 | 20 |
| 2 | 16 | 21 |
| 3 | 16 | 22 |
| 0 | 17 | 23 |
| 1 | 17 | 24 |
| 2 | 17 | 25 |
| 3 | 17 | 26 |
| 0 | 18 | 27 |
| 1 | 18 | 28 |
| 2 | 18 | 29 |
| 3 | 18 | 30 |
| 0 | 19 | 31 |
| 1 | 19 | 32 |
| 2 | 19 | 33 |
| 3 | 19 | 34 |
| 0 | 20 | 35 |
| 1 | 20 | 36 |
| 2 | 20 | 37 |
| 3 | 20 | 38 |
| 0 | 21 | 39 |
| 1 | 21 | 40 |
| 2 | 21 | 41 |
| 3 | 21 | 42 |
| 0 | 22 | 43 |
| 1 | 22 | 44 |
| 2 | 22 | 45 |
| 3 | 22 | 46 |

According to Mode 3, five CSI-RS resource configurations with 4 ports respectively are aggregated into a port number of the CSI-RS with 20 ports, as shown in Table 9:

TABLE 9

| Aggregation sequence numbers of CSI-RS resource configurations | Port numbers of CSI-RS resource configurations | Aggregated port number |
|---|---|---|
| 0 | 15 | 15 |
| 1 | 15 | 16 |
| 2 | 15 | 17 |
| 3 | 15 | 18 |
| 4 | 15 | 19 |
| 0 | 16 | 20 |
| 1 | 16 | 21 |
| 2 | 16 | 22 |
| 3 | 16 | 23 |
| 4 | 16 | 24 |
| 0 | 17 | 25 |
| 1 | 17 | 26 |
| 2 | 17 | 27 |
| 3 | 17 | 28 |
| 4 | 17 | 29 |
| 0 | 18 | 30 |
| 1 | 18 | 31 |
| 2 | 18 | 32 |
| 3 | 18 | 33 |
| 4 | 18 | 34 |

Embodiment 3

In this embodiment, the number of the ports of the CSI-RS resource is divided into a first set and a second set, where ports of the CSI-RS resource corresponding to a first set use a first type of port numbering mode, ports of the CSI-RS resource in a second set use a second type of port numbering mode, and the first type of port numbering mode is different from the second type of port numbering mode.

For example, {12, 16} ports are a set, which corresponds to port numbering mode 1; {20, 24, 28, 32} ports are a set, which corresponds to port numbering mode 2. For another example, {12, 16} ports are a set, which corresponds to port numbering mode 2; {20, 24, 28, 32} ports are a set, which corresponds to port numbering mode 3.

Embodiment 4

In this embodiment, the number of the ports of the CSI-RS resource is divided into a first set and a second set, where ports of the CSI-RS resource corresponding to a first set use a first type of port numbering mode, ports of the CSI-RS resource corresponding to a second set use a second type of port numbering mode, and the first type of port numbering mode is different from the second type of port numbering mode.

For example, {12, 16} ports are a set, which corresponds to port numbering mode 1 or port numbering mode 2; {20, 24, 28, 32} ports are a set, which corresponds to port numbering mode 3. For another example, {12, 20, 28} ports are a set, which corresponds to port numbering mode 1 or port numbering mode 2; {16, 24, 32} ports are a set, which corresponds to port numbering mode 2.

Embodiment 5

In this embodiment, the number of the ports of the CSI-RS resource configurations is divided into a first set and a second set, where ports of the CSI-RS resource corresponding to a first set use a first type of port numbering mode, ports of the CSI-RS resource corresponding to a second set use a second type of port numbering mode, and the first type of port numbering mode is different from the second type of port numbering mode.

For example, {4} ports of the CSI-RS resource configurations are a set, which corresponds to port numbering mode 1; {8} ports of the CSI-RS resource configurations is a set, which corresponds to port numbering mode 2. For another example, {4} ports of the CSI-RS resource configurations are a set, which corresponds to port numbering mode 2; {8} ports of the CSI-RS resource configurations is a set, which corresponds to port numbering mode 1.

Embodiment 6

In this embodiment, an array (the number of the ports of the CSI-RS resource configurations, the number of the CSI-RS resource configurations) is divided into a first set and a second set, where ports of the CSI-RS resource corresponding to a first set use a first type of port numbering mode, ports of the CSI-RS resource corresponding to a second set use a second type of port numbering mode, and the first type of port numbering mode is different from the second type of port numbering mode.

For example, array set {(8, 2),(4, 3)} corresponds to port numbering mode 1, and array set {(8, 3), (8, 4), (4, 5), (4, 7)} corresponds to port numbering mode 2; or, array set {(8, 2),(8, 3),(8, 4)} corresponds to port numbering mode 2, and array set {(4, 3), (4, 5), (4, 7)} corresponds to port numbering mode 1.

Embodiment 7

In this embodiment, the configuration information of the CSI process further includes information for indicating that a CSI-RS is periodic or aperiodic, where ports of the CSI-RS resource corresponding to a periodic CSI-RS use a first type of port numbering mode, ports of the CSI-RS resource corresponding to an aperiodic CSI-RS use a second type of port numbering mode, and the first type of port numbering mode is different from the second type of port numbering mode.

For example, a periodic CSI-RS corresponds to port numbering mode 1, and an aperiodic CSI-RS corresponds to port numbering mode 2; alternatively, a periodic CSI-RS corresponds to port numbering mode 2, and an aperiodic CSI-RS corresponds to port numbering mode 3.

Embodiment 8

In this embodiment, the configuration information of the CSI process further includes information of a codebook configuration mode, where the codebook configuration mode is divided into a first set and a second set, ports of the CSI-RS resource corresponding to a first set use a first type of port numbering mode, ports of the CSI-RS resource corresponding to a second set use a second type of port numbering mode, and the first type of port numbering mode is different from the second type of port numbering mode.

For example, a first set of codebook configuration mode corresponds to port numbering mode 1, and a second set of codebook configuration mode corresponds to port numbering mode 2; alternatively, a first set of codebook configuration mode corresponds to port numbering mode 2, and a second set of codebook configuration mode corresponds to port numbering mode 3.

Embodiment 9

In this embodiment, the configuration information of the CSI process further includes information of a correspondence manner of the ports of the CSI-RS resource and codeword column vector elements.

For example, g bit denotes the correspondence manner of the ports of the CSI-RS resource and codeword column vector elements; or X bit denotes a joint coding of a correspondence manner of information of the number of ports, the number of CSI-RS resource configurations, the number of the ports of the CSI-RS resource configurations, sequence numbers of the CSI-RS resource configurations, aggregation sequence numbers of the CSI-RS resource configurations, a port numbering mode, and the ports of the CSI-RS resource and codeword column vector elements.

Embodiment 10

In this embodiment, the correspondence manner of the ports of the CSI-RS resource and the codeword column vector elements is divided into a first set and a second set, where ports of the CSI-RS resource corresponding to a first set use a first type of port numbering mode, ports of the CSI-RS resource corresponding to a second set use a second type of port numbering mode, and the first type of port numbering mode is different from the second type of port numbering mode.

For example, a first set of correspondence manner of the ports of the CSI-RS resource and the codeword column vector elements corresponds to port numbering mode 1, and a second set of correspondence manner of the ports of the CSI-RS resource and the codeword column vector elements corresponds to port numbering mode 2; alternatively, a first set of correspondence manner of the ports of the CSI-RS resource and the codeword column vector elements corresponds to port numbering mode 2, and a second set of correspondence manner of the ports of the CSI-RS resource and the codeword column vector elements corresponds to port numbering mode 3.

Embodiment 11

In this embodiment, a candidate mode of the correspondence manner of the ports of the CSI-RS resource and the codeword column vector elements includes at least one of the following.

Mode 1: the port numbers in ascending order are in one-to-one correspondence with the codeword column vector elements in ascending order.

Mode 2: N/2 consecutive port numbers in ascending order are classified as one group, with 2K groups in total, and all the groups are numbered in ascending order; N/2 consecutive codeword column vector element numbers in ascending order are classified as one group, with 2K groups in total, and all the groups are numbered in ascending order; K even-numbered port groups are in one-to-one correspondence with K top-numbered codeword column vector element groups in ascending order, and K odd-numbered port groups are in one-to-one correspondence with K bottom-numbered codeword column vector element groups in ascending order; alternatively, K even-numbered port groups are in one-to-one correspondence with K bottom-numbered codeword column vector element groups in ascending order, and K odd-numbered port groups are in one-to-one correspondence with K top-numbered codeword column vector element groups in ascending order, where K is the number of the CSI-RS resource configurations, and N is the number of the ports of the CSI-RS resource configurations.

Mode 3: N/2 consecutive port numbers in ascending order are classified as one group, with 2K groups in total, and all the groups are numbered in ascending order; N/2 consecutive codeword column vector element numbers in ascending order are classified as one group, with 2K groups in total, and all the groups are numbered in ascending order; K even-numbered codeword column vector element groups are in one-to-one correspondence with K top-numbered port groups in ascending order, and K odd-numbered codeword column vector element groups are in one-to-one correspondence with K bottom-numbered port groups in ascending order; alternatively, K even-numbered codeword column vector element groups are in one-to-one correspondence with K bottom-numbered port groups in ascending order, and K odd-numbered codeword column vector element groups are in one-to-one correspondence with K top-numbered port groups in ascending order, where K is the number of the CSI-RS resource configurations, and N is the number of the ports of the CSI-RS resource configurations.

Mode 4: N consecutive port numbers in ascending order are classified as one group, with K groups in total, and all the groups are numbered in ascending order; N codeword column vector elements spaced by K elements in ascending order are classified as one group, with K groups in total, and all the groups are consecutively numbered in ascending order; and the port number groups are in one-to-one correspondence with the codeword column vector element group numbers in ascending order, where K is the number of the CSI-RS resource configurations, and N is the number of the ports of the CSI-RS resource configurations.

Mode 5: top-numbered half ports of each CSI-RS resource configuration are arranged into one group in ascending order of the aggregation sequence numbers of the CSI-RS resource configurations, and are in one-to-one correspondence with odd numbers of the code word column vector elements in ascending order; and bottom-numbered half ports of each CSI-RS resource configuration are arranged into another group in ascending order of the aggregation sequence numbers of the CSI-RS resource configurations, and are in one-to-one correspondence with even numbers of the code word column vector elements; alternatively, top-numbered half ports of each CSI-RS resource configuration are arranged into one group in ascending order of the aggregation sequence numbers of the CSI-RS resource configurations, and are in one-to-one correspondence with even numbers of the code word column vector elements in ascending order; and bottom-numbered half ports of each CSI-RS resource configuration are arranged into another group in ascending order of the aggregation sequence numbers of the CSI-RS resource configurations, and are in one-to-one correspondence with odd numbers of the code word column vector elements.

For example, N=8, K=2, or N=4, K=3, or N=8, K=3, or N=4, K=5, or N=8, K=4, or N=4, K=7.

Embodiment 12

In this embodiment, the configuration information of the CSI-RS resource further includes a port code division multiplexing type, where the port code division multiplexing type is divided into a first set and a second set, ports of the CSI-RS resource corresponding to a first set use a first type mode to correspond to code word column vector elements, ports of the CSI-RS resource corresponding to a second set use a second type mode to correspond to the code word column vector elements, and the first type mode is different from the second type mode.

For example, the port code division multiplexing type is divided into a set with a length of code division multiplexing of 2 and a set with a length of code division multiplexing of 4, the first set corresponds to mode 1, and the second set corresponds to mode 2; alternatively, the first set corresponds to mode 3, and the second set corresponds to mode 4. For another example, the port code division multiplexing type is divided into a set with lengths of code division multiplexing of 2 and 4 and a set with a length of code division multiplexing of 8, the first set corresponds to mode 1, and the second set corresponds to mode 2; alternatively, the first set corresponds to mode 3, and the second set corresponds to mode 4.

Embodiment 13

In this embodiment, the number of the ports of the CSI-RS resource is divided into a first set and a second set, ports of the CSI-RS resource corresponding to a first set use a first type mode to correspond to code word column vector elements, ports of the CSI-RS resource corresponding to a second set use a second type mode to correspond to the code word column vector elements, and the first type mode is different from the second type mode.

For example, the number of the ports of the CSI-RS resource is divided into the following a first set and a second set: a first set {12, 16}, and a second set {20, 24, 28, 32}. The first set corresponds to mode 1, and the second set corresponds to mode 2; alternatively, the number of the ports of the CSI-RS resource is divided into the following a first set and a second set: a first set {12, 20, 28}, and a second set {16, 24, 32}. The first set corresponds to mode 3, and the second set corresponds to mode 4.

Embodiment 14

In this embodiment, the number of the ports of the CSI-RS resource is divided into a first set and a second set, ports of the CSI-RS resource corresponding to a first set use a first type mode to correspond to code word column vector elements, ports of the CSI-RS resource corresponding to a second set use the first type mode or a second type mode to correspond to the code word column vector elements, and the first type of port numbering mode is different from the second type of port numbering mode.

For example, the number of the ports of the CSI-RS resource is divided into the following a first set and a second set: a first set {12, 16}, and a second set {20, 24, 28, 32}. The first set corresponds to mode 1, and the second set corresponds to mode 1 or mode 2; alternatively, the number of the ports of the CSI-RS resource is divided into the following a first set and a second set: a first set {12, 20, 28}, and a second set {16, 24, 32}. The first set corresponds to mode 3, and the second set corresponds to mode 3 or mode 4.

Embodiment 15

In this embodiment, the number of the ports of the CSI-RS resource configurations is divided into a first set and a second set, ports of the CSI-RS resource corresponding to a first set use a first type mode to correspond to code word column vector elements, ports of the CSI-RS resource corresponding to a second set use a second type mode to correspond to the code word column vector elements, and the first type mode is different from the second type mode.

For example, the number of the ports of the CSI-RS resource configurations is divided into the following a first set and a second set: a first set {4}, and a second set {8}. The first set corresponds to mode 1, and the second set corresponds to mode 2; alternatively, the first set corresponds to mode 3, and the second set corresponds to mode 4.

Embodiment 16

In this embodiment, an array (the number of the ports of the CSI-RS resource configurations, the number of the CSI-RS resource configurations) is divided into a first set and a second set, ports of the CSI-RS resource corresponding to a first set use a first type mode to correspond to code word column vector elements, ports of the CSI-RS resource corresponding to a second set use a second type mode to correspond to the code word column vector elements, and the first type mode is different from the second type mode.

For example, the array is divided into the following a first set and a second set: a first set {(8, 2), (4, 3)}, and a second set {(8, 3), (4, 5), (8, 4), (4, 7)}. The first set corresponds to mode 1, and the second set corresponds to mode 2; alternatively, the first set corresponds to mode 3, and the second set corresponds to mode 4. Alternatively, the array is divided into the following a first set and a second set: a first set {(8, 2), (8, 3), (8, 4)}, and a second set {(4, 3), (4, 5), (4, 7)}. The first set corresponds to mode 1, and the second set corresponds to mode 2; alternatively, the first set corresponds to mode 3, and the second set corresponds to mode 4.

Embodiment 17

In this embodiment, the configuration information of the CSI process further includes information for indicating that a CSI-RS is periodic or aperiodic, where ports of the CSI-RS resource corresponding to a periodic CSI-RS use a first type mode to correspond to code word column vector elements, ports of the CSI-RS resource corresponding to an aperiodic CSI-RS use a second type mode to correspond to the code word column vector elements, and the first type mode is different from the second type mode.

For example, a periodic CSI-RS corresponds to mode 1, and an aperiodic CSI-RS corresponds to mode 2; alternatively, a periodic CSI-RS corresponds to mode 3, and an aperiodic CSI-RS corresponds to mode 4.

Embodiment 18

In this embodiment, the configuration information of the CSI-RS measurement process further includes information of a codebook configuration mode, where the codebook configuration mode is divided into a first set and a second set, ports of the CSI-RS resource corresponding to a first set use a first type mode to correspond to code word column vector elements, ports of the CSI-RS resource corresponding to a second set use a second type mode to correspond to the code word column vector elements, and the first type mode is different from the second type mode.

For example, a first set of codebook configuration mode corresponds to mode 1, and a second set of codebook configuration mode corresponds to mode 2; alternatively, a first set of codebook configuration mode corresponds to mode 2, and a second set of codebook configuration mode corresponds to mode 3.

Embodiment 19

In this embodiment, the port numbering mode of the CSI-RS resource is divided into a first set and a second set, ports of the CSI-RS resource corresponding to a first set use a first type mode to correspond to code word column vector elements, ports of the CSI-RS resource corresponding to a second set use a second type mode to correspond to the code word column vector elements, and the first type mode is different from the second type mode.

For example, the port numbering mode is divided into a first set and a second set: a first set {port numbering mode 1, port numbering mode 2}, and a second set {port numbering mode 3}. The first set corresponds to mode 1, and the second set corresponds to mode 2; alternatively, the first set corresponds to mode 3, and the second set corresponds to mode 4.

Embodiments of the disclosure further provide a storage medium. In this embodiment, the above storage medium may be configured to store program code for performing the following steps.

S1, Generate signaling including configuration information of a channel state information (CSI) measurement process.

S2, transmit the signaling including the configuration information of the CSI process.

The configuration information of the CSI process includes at least one of the following information: configuration information of a channel state information reference signal (CSI-RS) resource, the configuration information of the CSI-RS resource including: a number of ports of the CSI-RS resource, a number of CSI-RS resource configurations, a number of ports of the CSI-RS resource configurations, sequence numbers of the CSI-RS resource configurations, aggregation sequence numbers of the CSI-RS resource configurations, and a port numbering mode.

In this embodiment, the foregoing storage medium may include, but not limited to various media that can store program code, such as a USB flash disk, a read-only memory (ROM), a random access memory (RAM), a mobile hard disk, a magnetic disk, or an optical disc.

In this embodiment, a processor generates, according to the stored program code in the storage medium, signaling including configuration information of a channel state information (CSI) measurement process;

In this embodiment, the processor sends, according to the stored program code in the storage medium, the signaling including the configuration information of the CSI process; where the configuration information of the CSI process includes at least one of the following information: configuration information of a channel state information reference signal (CSI-RS) resource, the configuration information of the CSI-RS resource including: a number of ports of the CSI-RS resource, a number of CSI-RS resource configurations, a number of ports of the CSI-RS resource configurations, sequence numbers of the CSI-RS resource configurations, aggregation sequence numbers of the CSI-RS resource configurations, and a port numbering mode.

For specific examples in this embodiment, reference may be made to the examples described in the foregoing embodiments and optional embodiments, and details are not described herein.

Obviously, persons skilled in the art should know that the modules or steps of embodiments of the disclosure may be implemented by a universal computing device, and these modules or steps may be concentrated on a single computing device or distributed on a network consisting of a plurality of computing devices, and may optionally be implemented by programmable codes executable by the computing devices, so that these components or steps may be stored in a storage device for execution with the computing devices, and may be implemented, in some circumstances, by executing the shown or described steps in sequences different from those described here, or making the steps into integrated circuit modules respectively, or making multiple modules or steps therein into a single integrated circuit module. Thus, the disclosure is not limited to any specific hardware and software combination.

In the embodiments of the disclosure, if the information processing method is implemented in the form of a software function module and is sold or used as a stand-alone product, the module may also be stored in a computer readable storage medium. Based on this understanding, the technical solution of the embodiments of the disclosure essentially, or a part contributing to the prior art, or all or a part of the technical solution may be embodied in a form of a software product. The computer software product is stored in a storage medium, and includes several instructions to enable a computer device (which may be a personal computer, a server, or a network device) to execute all or some of the method according to the embodiments of the disclosure. The foregoing storage medium includes various media that can store program code, such as a USB flash disk, a mobile hard disk, a read-only memory (ROM), a magnetic disk, or an optical disc. Thus, the embodiments of the disclosure is not limited to any specific hardware and software combination.

Accordingly, an embodiment of the disclosure further provides a computer storage medium. The computer storage medium stores a computer program for performing the above information processing method of an embodiment of the disclosure.

The foregoing is merely illustrative of the preferred embodiments of the present invention and is not intended to limit the present invention, and various changes and modifications may be made by those skilled in the art. Any modifications, equivalent substitutions, improvements, and the like within the spirit and principles of the invention are intended to be included within the scope of the present invention.

The invention claimed is:

1. An information processing method, comprising:
generating signaling comprising configuration information of a channel state information (CSI) process; and
transmitting the signaling comprising the configuration information of the CSI process,
wherein the configuration information of the CSI process comprises at least one of the following configuration information of a channel state information reference signal (CSI-RS) resource, comprising: a number of ports of the CSI-RS resource, a number of CSI-RS resource configurations, a quantity of ports of the CSI-RS resource configurations, sequence numbers of the CSI-RS resource configurations, aggregation sequence numbers of the CSI-RS resource configurations, and a port numbering mode,
wherein the number of the ports of the CSI-RS resource is divided into a first set and a second set, wherein ports of the CSI-RS resource corresponding to a first set use a first type of port numbering mode, ports of the CSI-RS resource corresponding to a second set use a second type of port numbering mode, and the first type of port numbering mode is different from the second type of port numbering mode.

2. The method of claim 1, wherein the port numbering mode comprises at least one of the following:
consecutively numbering all the ports of the CSI-RS resource configurations in ascending order of the aggregation sequence numbers of the CSI-RS resource configurations;
sorting top-numbered half ports of each CSI-RS resource configuration as a first half ports in ascending order of the aggregation sequence numbers of the CSI-RS resource configurations, and sorting bottom-numbered half ports of each CSI-RS resource configuration as a second half ports in ascending order of the aggregation sequence numbers of the CSI-RS resource configurations, and consecutively numbering the first half ports and the second half ports; or
consecutively numbering all the ports extracted, one at a time, from the CSI-RS resource configurations in turn, in ascending order of the aggregation sequence numbers of the CSI-RS resource configurations.

3. The method of claim 1, wherein the configuration information of the CSI process further comprises information for indicating that a CSI-RS is periodic or aperiodic, wherein ports of the CSI-RS resource corresponding to a periodic CSI-RS use a first type of port numbering mode, ports of the CSI-RS resource corresponding to an aperiodic CSI-RS use a second type of port numbering mode, and the first type of port numbering mode is different from the second type of port numbering mode.

4. The method of claim 1, wherein the configuration information of the CSI process further comprises information of a codebook configuration mode, wherein the codebook configuration mode is divided into a first set and a second set, ports of the CSI-RS resource corresponding to the first set use a first type of port numbering mode, ports of the CSI-RS resource corresponding to the second set use a second type of port numbering mode, and the first type of port numbering mode is different from the second type of port numbering mode.

5. The method of claim 1, wherein the configuration information of the CSI process further comprises information of a correspondence manner of the ports of the CSI-RS resource and codeword column vector elements.

6. The method of claim 1, wherein the configuration information of the CSI-RS resource further comprises a port code division multiplexing type, wherein the port code division multiplexing type is divided into a first set and a second set, ports of the CSI-RS resource corresponding to the first set use a first type mode to correspond to code word column vector elements, ports of the CSI-RS resource corresponding to the second set use a second type mode to correspond to the code word column vector elements, and the first type mode is different from the second type mode.

7. An information processing apparatus, comprising:
a processor; and
a memory storing computer executable instructions, which, when executed by the processor, cause the processor to perform a method comprising:
generating signaling comprising configuration information of a channel state information (CSI) process; and
transmitting the signaling comprising the configuration information of the CSI process,
wherein the configuration information of the CSI process comprises at least one of the following information: configuration information of a channel state information reference signal (CSI-RS) resource, the configuration information of the CSI-RS resource comprising: a number of ports of the CSI-RS resource, a number of CSI-RS resource configurations, a number of ports of the CSI-RS resource configurations, sequence numbers of the CSI-RS resource configurations, aggregation sequence numbers of the CSI-RS resource configurations, and a port numbering mode,
wherein the number of the ports of the CSI-RS resource is divided into a first set and a second set, wherein ports of the CSI-RS resource corresponding to the first set use a first type of port numbering mode, ports of the CSI-RS resource corresponding to the second set use a second type of port numbering mode, and the first type of port numbering mode is different from the second type of port numbering mode.

8. The apparatus of claim 7, wherein the port numbering mode comprises at least one of the following:
consecutively numbering all the ports of the CSI-RS resource configurations in ascending order of the aggregation sequence numbers of the CSI-RS resource configurations;
sorting top-numbered half ports of each CSI-RS resource configuration as a first half ports in ascending order of the aggregation sequence numbers of the CSI-RS resource configurations, and sorting bottom-numbered half ports of each CSI-RS resource configuration as a second half ports in ascending order of the aggregation sequence numbers of the CSI-RS resource configurations, and consecutively numbering the first half ports and the second half ports; or consecutively numbering all the ports extracted, one at a time, from the CSI-RS resource configurations in turn, in ascending order of the aggregation sequence numbers of the CSI-RS resource configurations.

9. An information processing method, comprising:

receiving signaling comprising configuration information of a channel state information (CSI) process; and parsing the signaling comprising the configuration information of the CSI process, wherein the configuration information of the CSI process comprises at least one of the following configuration information of a channel state information reference signal (CSI-RS) resource, comprising: a number of ports of the CSI-RS resource, a number of CSI-RS resource configurations, a number of ports of the CSI-RS resource configurations, sequence numbers of the CSI-RS resource configurations, aggregation sequence numbers of the CSI-RS resource configurations, and a port numbering mode, wherein the number of the ports of the CSI-RS resource is divided into a first set and a second set, wherein ports of the CSI-RS resource corresponding to the first set use a first type of port numbering mode, ports of the CSI-RS resource corresponding to the second set use the first type of port numbering mode or a second type of port numbering mode, and the first type of port numbering mode is different from the second type of port numbering mode.

10. The method of claim 9, wherein the port numbering mode comprises at least one of the following:

consecutively numbering all the ports of the CSI-RS resource configurations in ascending order of the aggregation sequence numbers of the CSI-RS resource configurations;

sorting top-numbered half ports of each CSI-RS resource configuration as a first half ports in ascending order of the aggregation sequence numbers of the CSI-RS resource configurations, and sorting bottom-numbered half ports of each CSI-RS resource configuration as a second half ports in ascending order of the aggregation sequence numbers of the CSI-RS resource configurations, and consecutively numbering the first half ports and the second half ports; or consecutively numbering all the ports extracted, one at a time, from the CSI-RS resource configurations in turn, in ascending order of the aggregation sequence numbers of the CSI-RS resource configurations.

11. The method of claim 9, wherein the configuration information of the CSI process further comprises information for indicating that a CSI-RS is periodic or aperiodic, wherein ports of the CSI-RS resource corresponding to a periodic CSI-RS use a first type of port numbering mode, ports of the CSI-RS resource corresponding to an aperiodic CSI-RS use a second type of port numbering mode, and the first type of port numbering mode is different from the second type of port numbering mode.

12. The method of claim 9, wherein the configuration information of the CSI process further comprises information of a codebook configuration mode, wherein the codebook configuration mode is divided into a first set and a second set, ports of the CSI-RS resource corresponding to the first set use a first type of port numbering mode, ports of the CSI-RS resource corresponding to the second set use a second type of port numbering mode, and the first type of port numbering mode is different from the second type of port numbering mode.

13. The method of claim 9, wherein the configuration information of the CSI process further comprises information of a correspondence manner of the ports of the CSI-RS resource and codeword column vector elements.

14. The method of claim 9, wherein the configuration information of the CSI-RS resource further comprises a port code division multiplexing type, wherein the port code division multiplexing type is divided into a first set and a second set, ports of the CSI-RS resource corresponding to the first set use a first type mode to correspond to code word column vector elements, ports of the CSI-RS resource corresponding to the second set use a second type mode to correspond to the code word column vector elements, and the first type mode is different from the second type mode.

15. An information processing apparatus, comprising:

a processor; and a memory storing computer executable instructions, which, when executed by the processor, cause the processor to perform a method comprising:

receiving signaling comprising configuration information of a channel state information (CSI) process; and parsing the signaling comprising the configuration information of the CSI process, wherein the configuration information comprises at least one of the following configuration information of a channel state information reference signal (CSI-RS) resource, comprising: a number of ports of the CSI-RS resource, a number of CSI-RS resource configurations, a number of ports of the CSI-RS resource configurations, sequence numbers of the CSI-RS resource configurations, aggregation sequence numbers of the CSI-RS resource configurations, and a port numbering mode, wherein the number of the ports of the CSI-RS resource is divided into a first set and a second set, wherein ports of the CSI-RS resource corresponding to a first set use a first type of port numbering mode, ports of the CSI-RS resource corresponding to the second set use a second type of port numbering mode, and the first type of port numbering mode is different from the second type of port numbering mode.

16. The apparatus of claim 15, wherein the port numbering mode comprises at least one of the following:

consecutively numbering all the ports of the CSI-RS resource configurations in ascending order of the aggregation sequence numbers of the CSI-RS resource configurations;

sorting top-numbered half ports of each CSI-RS resource configuration as a first half ports in ascending order of the aggregation sequence numbers of the CSI-RS resource configurations, and sorting bottom-numbered half ports of each CSI-RS resource configuration as a second half ports in ascending order of the aggregation sequence numbers of the CSI-RS resource configurations, and consecutively numbering the first half ports and the second half ports; or consecutively numbering all the ports extracted, one at a time, from the CSI-RS resource configurations in turn, in ascending order of the aggregation sequence numbers of the CSI-RS resource configurations.

* * * * *